(12) United States Patent
Blanchfield, Jr.

(10) Patent No.: US 10,635,756 B2
(45) Date of Patent: Apr. 28, 2020

(54) METHOD AND SYSTEM FOR DESIGNING GOODS

(71) Applicant: Bushel Stop, Inc., Severna Park, MD (US)

(72) Inventor: Robert J. Blanchfield, Jr., Severna Park, MD (US)

(73) Assignee: Bushel Stop Inc., Severna Park, MD (US)

( * ) Notice: Subject to any disclaimer, the term of this patent is extended or adjusted under 35 U.S.C. 154(b) by 840 days.

(21) Appl. No.: 14/218,382

(22) Filed: Mar. 18, 2014

(65) Prior Publication Data

US 2014/0309765 A1    Oct. 16, 2014

Related U.S. Application Data

(60) Provisional application No. 61/790,270, filed on Mar. 15, 2013.

(51) Int. Cl.
*G06F 17/50* (2006.01)
*B29C 64/386* (2017.01)

(52) U.S. Cl.
CPC ............ *G06F 17/50* (2013.01); *B29C 64/386* (2017.08); *G06F 2217/04* (2013.01)

(58) Field of Classification Search
CPC .............. G06Q 10/101; G06Q 20/123; G06Q 30/0621; G06Q 50/01; G06F 2217/04; G06F 17/5004
See application file for complete search history.

(56) References Cited

U.S. PATENT DOCUMENTS

| | | | |
|---|---|---|---|
| 6,928,396 B2 | 8/2005 | Thackston | |
| 7,176,942 B2 | 2/2007 | Chartier et al. | |
| 7,484,183 B2 | 1/2009 | Look et al. | |
| 7,533,034 B2 | 5/2009 | Laurin et al. | |
| 8,229,715 B1* | 7/2012 | Teller | G06F 17/50 434/72 |

(Continued)

FOREIGN PATENT DOCUMENTS

| | | |
|---|---|---|
| CN | 1315705 A | 10/2001 |
| CN | 101281550 A | 10/2008 |

(Continued)

OTHER PUBLICATIONS

Office Action for JP 2016-5025896 dated May 24, 2018 (non english).

(Continued)

*Primary Examiner* — Sang H Kim
(74) *Attorney, Agent, or Firm* — Blank Rome LLP

(57) ABSTRACT

A system for computer-aided design of an object, including a first computer system operated by a first user, a second computer system operated by a second user, an application server hosting a design software application, and a web server providing an interface for at least the first user to access the design software application. The design software application may be configured to receive a first input comprising a first modification to a design template or creating a new design from the first computer system, receive a second input comprising a second modification to the design template from second computer system, and modify the design template based on the first and second modifications to generate a modified design.

17 Claims, 4 Drawing Sheets

(56) References Cited

U.S. PATENT DOCUMENTS

| | | | |
|---|---|---|---|
| 8,239,283 B2 | 8/2012 | Hanechak | |
| 9,159,106 B1* | 10/2015 | Bodell | G06Q 10/06 |
| 2001/0047251 A1 | 11/2001 | Kemp | |
| 2002/0035451 A1 | 3/2002 | Rothermel | |
| 2002/0054019 A1* | 5/2002 | Rosenberg | G06F 3/011 |
| | | | 345/157 |
| 2002/0156757 A1 | 10/2002 | Brown | |
| 2002/0161660 A1 | 10/2002 | Giardino et al. | |
| 2002/0199110 A1 | 12/2002 | Kean | |
| 2003/0036947 A1 | 2/2003 | Smith et al. | |
| 2004/0034576 A1 | 2/2004 | Jones et al. | |
| 2005/0251462 A1 | 11/2005 | Nykamp | |
| 2006/0106627 A1 | 5/2006 | Al-Nujaidi | |
| 2006/0116930 A1 | 6/2006 | Goldstein | |
| 2007/0050234 A1 | 3/2007 | Corlett | |
| 2009/0106669 A1 | 4/2009 | Winkler et al. | |
| 2010/0299616 A1* | 11/2010 | Chen | G06Q 10/10 |
| | | | 715/753 |
| 2010/0318442 A1 | 12/2010 | Paul et al. | |
| 2011/0004524 A1 | 1/2011 | Paul et al. | |
| 2011/0010265 A1* | 1/2011 | Hendricks | G06Q 30/06 |
| | | | 705/26.5 |
| 2011/0093539 A1 | 4/2011 | Laurin et al. | |
| 2011/0153052 A1* | 6/2011 | Pettibone | G06F 17/5004 |
| | | | 700/98 |
| 2011/0218664 A1* | 9/2011 | Zeng | G06F 19/00 |
| | | | 700/132 |
| 2011/0313878 A1* | 12/2011 | Norman | G06Q 30/0621 |
| | | | 705/26.5 |
| 2012/0010922 A1 | 1/2012 | Smith | |
| 2012/0110595 A1 | 5/2012 | Reitman et al. | |
| 2012/0123588 A1 | 5/2012 | Cloran et al. | |
| 2012/0215663 A1 | 8/2012 | Coene et al. | |
| 2012/0231424 A1 | 9/2012 | Calman et al. | |
| 2012/0281013 A1 | 11/2012 | Mandavi et al. | |
| 2013/0218714 A1* | 8/2013 | Watkins | G06Q 30/0631 |
| | | | 705/26.7 |
| 2014/0129935 A1* | 5/2014 | Ovadia Nahon | G06F 3/01 |
| | | | 715/716 |
| 2014/0279170 A1* | 9/2014 | Siddappa | G06Q 30/0611 |
| | | | 705/26.4 |
| 2016/0117742 A1* | 4/2016 | Chen | G06Q 10/10 |
| | | | 705/26.2 |

FOREIGN PATENT DOCUMENTS

| | | |
|---|---|---|
| JP | 09282352 | 10/1997 |
| JP | 2002-248692 A | 9/2002 |
| JP | 2009-146256 A | 7/2009 |
| JP | 2013-11961 A | 1/2013 |
| KR | 20120114253 A | 10/2012 |
| WO | 2001013305 A1 | 2/2001 |
| WO | 2001097067 A2 | 12/2001 |

OTHER PUBLICATIONS

The Written Opinion for Singapore Patent Application No. 11201507670P dated Nov. 27, 2017.

A Chinese Office Action and Search Report for Appl. No. 201480021492.0 dated Feb. 1, 2018.

* cited by examiner

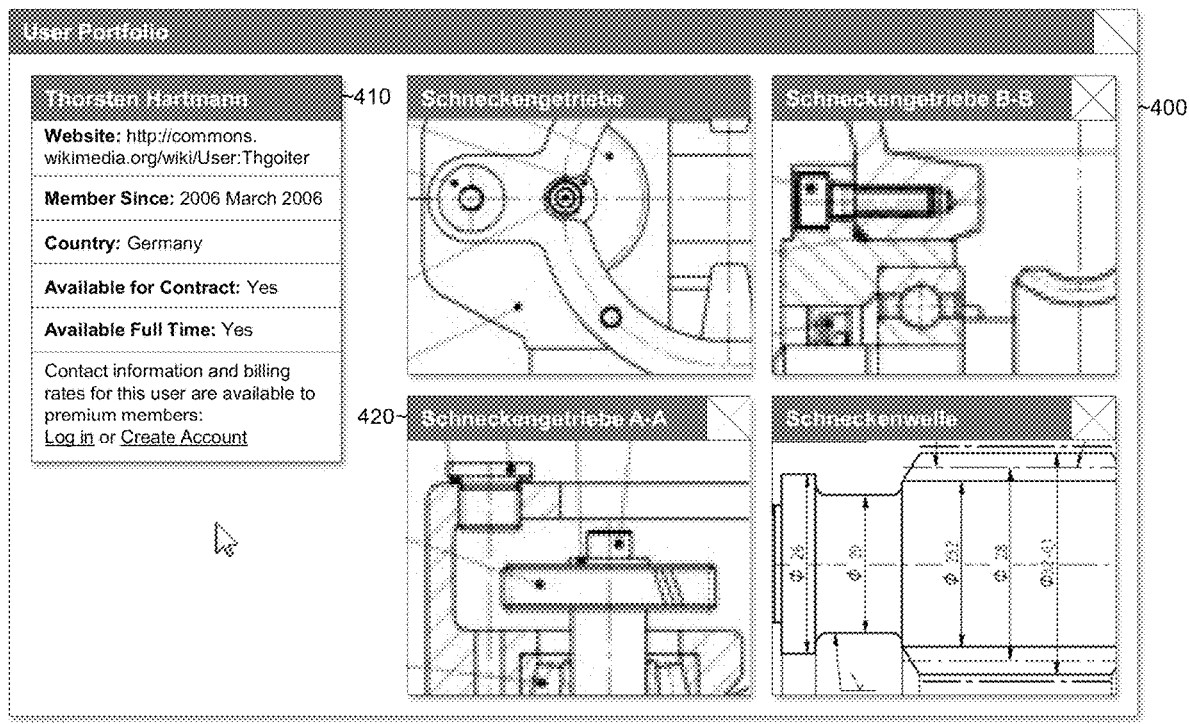
FIG. 4  DESIGN IMAGES LICENSED UNDER CREATIVE COMMONS ATTRIBUTION-SHARE ALIKE 3.0

METHOD AND SYSTEM FOR DESIGNING GOODS

CROSS REFERENCE TO RELATED APPLICATIONS

This application claims priority to U.S. Provisional Patent Application No. 61/790,270, filed on Mar. 15, 2013, the disclosure of which is incorporated herein by reference.

BACKGROUND OF THE INVENTION

1. Field of the Invention

The present invention relates to methods and systems for designing goods, and more particularly to methods and systems for computer-aided design, sale, purchase, licensing, printing, manufacturing, shipping, and delivery of objects, articles, and other materials, by an individual or collaboratively by a group of individuals, using a network of computers.

2. Description of the Prior Art

The modern personal computer is exponentially more powerful than was available to a typical consumer in previous decades. Whereas computer-aided design (CAD) software and the processing power necessary to it were previously available only to industry professionals, the modern consumer is now capable of designing, testing, and virtually modeling complex designs using software available to the consumer. At the same time, three dimensional (3-D) printing allows for the fabrication of a prototype or a number of finished products. 3-D printing is expected to grow as the cost of 3-D printers falls and the availability of 3-D printers grows. Alternatively, a third party may manufacture one or more objects based on the computer-aided design.

As CAD software and hardware becomes available to more users, there is a need for those users to benefit from the knowledge and experience of others by providing them with methods and systems that allow them to work collaboratively. Additionally, there is a need for designers to market their designs and design skills to potential employers and customers.

SUMMARY OF THE INVENTION

In order to provide these and other benefits, there is provided a system for computer-aided design of an object. According to an exemplary embodiment of the present invention, a system for computer-aided design of an object is provided, including a first computer system operated by a first user, a second computer system operated by a second user, an application server hosting a design software application, and a web server providing an interface for at least the first user to access the design software application. The design software application may be configured to receive a first input comprising a first modification to a design template or creating a new design from the first computer system, receive a second input comprising a second modification to the design template from second computer system, and modify the design template based on the first and second modifications to generate a modified design.

BRIEF DESCRIPTION OF THE DRAWINGS

The above-mentioned and other advantages and features of the present invention, as well as the invention itself, will become more readily apparent from the following detailed description when read together with the following figures, of which:

FIG. 4 is a user interface 400 of a user profile 251 described with reference to FIG. 2, according to an exemplary embodiment of the present invention.

DETAILED DESCRIPTION OF THE INVENTION

Figure 1:
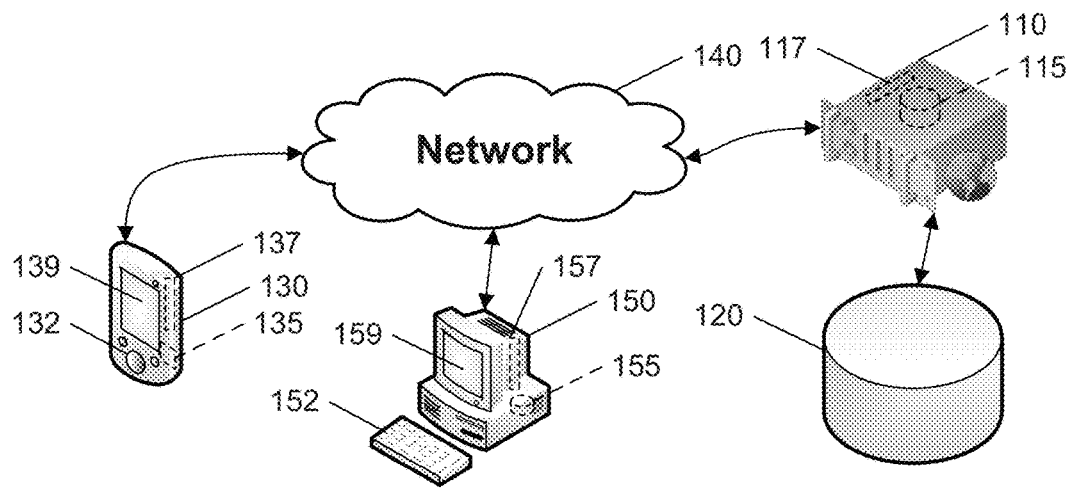
FIG. 1 is an overview of a networked computer system according to an exemplary embodiment of the present invention.

Reference to the drawings illustrating various views of exemplary embodiments of the present invention is now made. In the drawings and the description of the drawings herein, certain terminology is used for convenience only and is not to be taken as limiting the embodiments of the present invention. Furthermore, in the drawings and the description below, like numerals indicate like elements throughout.

Illustrated in FIG. 1 is an exemplary networked computer system, generally designated as 100, in accordance with an exemplary embodiment of the present invention. The networked computer system 100 comprises a server 110 connected to a plurality of remote computer systems, such as a mobile computer system 130 and a personal computer system 150, via a network 140.

In an exemplary embodiment, the network 140 is the Internet.

In an exemplary embodiment, the server 110 comprises an application server, which may execute, for example, a collaborative design software application, and a web server, which hosts a website accessible by the computer systems 130 and 150, to provide an interface to the collaborative design software application. In this way, the design software application is a web application interfaced with the website. The system 100 may be used by a single user, or multiple users simultaneously.

The server 110 comprises an internal storage device 115, which comprises a tangible computer-readable storage medium, such as a hard disk array or solid-state memory, for storing software instructions that, when executed by the server 110, carry out relevant portions of the features described herein.

The server 110 maintains a database 120 for storing templates of designs for objects, articles, consumer goods, and the like, modified designs of the same, and collaboratively modified designs. The database 120 may be internal to the server 110, in which case it is stored on the storage device 115, or it may be external to the server 110, in which case it may be stored on an external storage device, such as an external hard disk array or solid-state memory.

The computer systems 130 and 150 also respectively comprise internal storage devices 135 and 155, for storing software instructions that, when executed by the computer systems 130 and 150, carry out relevant portions of the features described herein.

As noted above, the database 120 may store templates of designs for various objects, articles, goods, etc. The designs may be designed by a user of a computer system, e.g., the computer system 130 or 150, through the design software application accessed via the web server or uploaded to the server 110 through the network 140. (For convenience herein, a user of the computer system 130 is referred to as "the user 130," and a user of the computer system 150 is referred to as "the user 150.") When finished designing the preconfigured design, the user instructs the server 110 to store the preconfigured design, and the server 110 stores it in the database 120 for later retrieval for use as a template for a design to be collaboratively modified by the users 130 and 150. Exemplary templates may be used for automobile parts, articles of clothing, household appliances, etc.

During a design process, including a collaborative design process, the user or users 130 and 150 access the website to retrieve a design, e.g., template, and modify individually or collaboratively a design based on the retrieved template. In an exemplary embodiment, the design software application is a computer-aided design (CAD)-type software application that provides for creating designs for the templates and for modifying designs based on retrieved templates. The CAD-type software application includes a suite of design tools to guide the users 130 and 150 through the modification process, as well as to convert other file types to a format compatible with the CAD-type software application.

The collaborative design software application is "smart" in that it guides users 130 and 150 to make modifications that satisfy predetermined criteria of the template. Such criteria may include changes that must satisfy government-mandated rules, how parts may or may not fit together, and choices for materials of construction. The design software application may issue alarms or error messages for modifications that do not satisfy the criteria, particularly with respect to those affecting safety or known manufacturing issues. The criteria may be stored as numerical or textual parameters, ranges, limits, specific values, combinations, approximations, and may be indexed and cross-linked for use across multiple designs (for example, a numerical limit may apply to multiple designs). The criteria may relate to standards, such as ASE, ASME, NIST, and other government and non-government (e.g., trade associations, university curriculum, manufacturer, etc.) standards. If not being used to satisfy some other user's design requirements, the criteria can be overridden or ignored, as can the warnings.

The collaborative design software application may include an interface that allows a user to access advanced tools for testing the designed article including: a) stress testing; b) load testing; c) wind tunnel testing; d) etc. For example, the collaborative design software may simulate the manufacture of a virtual object based on a design or template and simulate an effect of an external force such as gravity, wind forces, or a load force on the virtual object. When simulating the effect of wind forces on a virtual object, the collaborative design software application may determine whether wind forces of a specific velocity, frequency, amplitude or direction may cause the designed article to experience harmonic oscillation. If the designer intends for the object to oscillate (for example, at a given frequency) the collaborative design software may highlight the area(s) of the design which might be modified to allow harmonic oscillation. Alternatively, if dangerous levels of harmonic oscillation are detected, the collaborative design software may highlight area(s) of the design which may be modified to reduce or eliminate the harmonic oscillation.

Figure 1A:
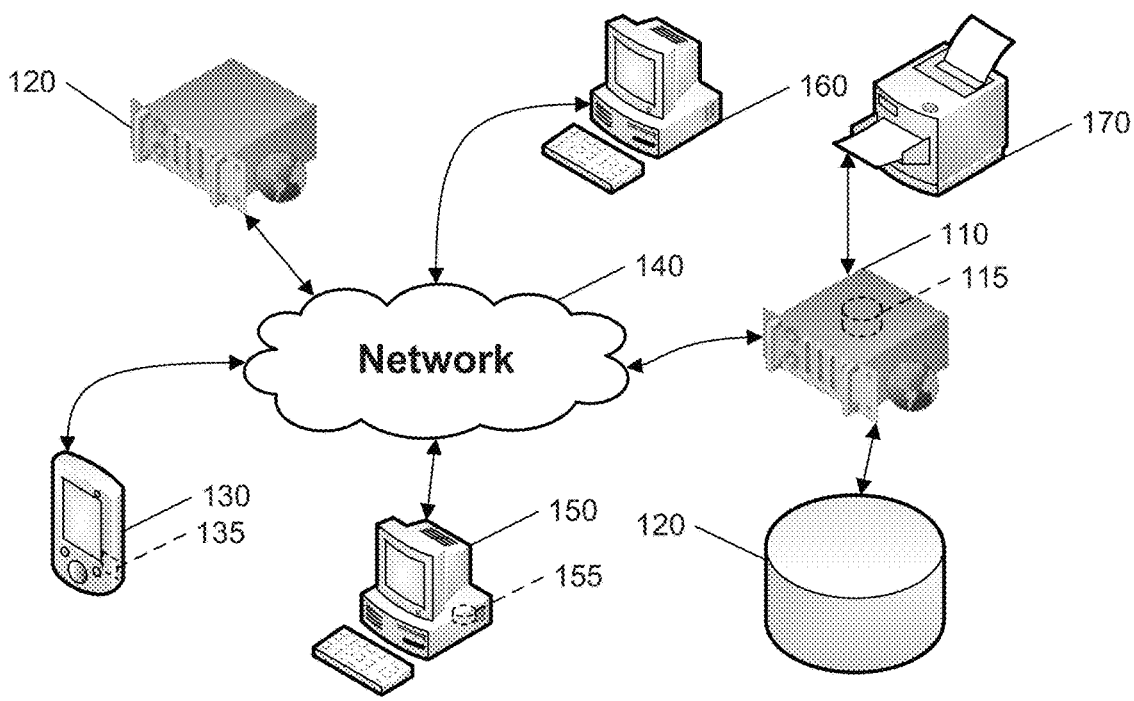
FIG. 1A is an overview of a networked computer system according to another exemplary embodiment of the present invention.

Referring now to FIG. 1A, there is illustrated an exemplary alternative embodiment of the system 100, generally designated as 100', in accordance with an exemplary embodiment of the present invention. The system 100' includes all of the components of the system 100 and the features thereof and further includes a social networking/crowd-source collaboration feature on the website hosted by the server 110.

The social networking/crowd-source collaboration feature is embedded within the collaborative design software application and provides users, such as anyone who accesses the website, a select group of users who access the website, or only the users (e.g., the users 130 and 150) involved in a design, to vote on design changes, share ideas, allocate work among themselves, etc.

For example, the users of the collaborative design software application may be students in a university-level mechanical engineering class, and the collaborative design software application, in such embodiment, provides such students the ability to assign themselves different tasks on a larger design project, or the teacher to assign various design tasks as part of a larger design task.

In another exemplary embodiment, the system 100' also comprises a social network server to which the users 130 and 150 post their collaborative designs for feedback by other users.

The system 100', and specifically the website hosted by the server 110, further comprises a webpage accessible to industry representatives 160 to review designs. For example, an automobile manufacturer might acquire a new design for a front air dam for a specific model of automobile from the web site. If the industry representative 160 is an acquisition manager, he may acquire designs, such as by license, purchase, gift or other method of acquisition, from the users who created them via an interface on the website of the collaborative design software application and the rest of the system. The collaborative design software may enable users to charge a fee for their original designs and/or their modifications to existing designs. The collaborative design software may also be configured to charge a fee (e.g., a flat fee and/or a percentage) to either the designer (e.g., user 130) and/or the purchaser (e.g., the industry representative 160) for facilitating the transaction between the designer and the purchaser.

In another example, an industry representative 160 may be a human resources representative and may use the webpage to scout proficient users and, via the collaborative design software application, extend job offers to the proficient users. Again, the collaborative design software be configured to charge a fee (e.g., a flat fee and/or a percentage) to either the designer (e.g., user 130) and/or the industry representative 160 for facilitating the hiring of the designer by the industry representative 160.

If the industry representative 160 is an engineer, the engineer may use the webpage to tally votes on the designs of other users with the voting results producing ranked results to determine well-liked patterns for future designs. For example, any third-party who is not a user involved in the design may also submit a vote while only the industry representative may be permitted to see results of votes to determine popularity of designs. As described below, the collaborative design software application may be configured such that users of the software or other web users to vote or may restrict who can vote. Alternatively, the designer of each design may determine whether individuals can vote.

Other exemplary features and functionality of the system 100' are now described. In an exemplary embodiment of the system 100', the system 100' may further comprise a 3-D printer (or multiple printers) 170 connected to the server 110 (which may also be used with the embodiment shown in FIG. 1). After completing a collaborative design, the user 130 or 150 may instruct the server 110 to have a prototype or useable item created on the 3-D printer(s) 170. The 3-D printer 170 fabricates the prototype, which is then shipped to the user 130 or 150. In an exemplary alternative embodiment, the 3-D printer 170 is connected to the computer system 130 or 150 as a peripheral device.

Third-parties may access the website and print their own object using their own 3-D printer, by acquiring (purchasing) a one-time download or license, in a similar manner that users of popular websites select and download music files for personal use. Alternatively, a third party may order an object from the website for shipment to their residence, in a similar manner that users of popular websites select articles of clothes or household items and have them shipped to their residence. The object may be wood, metal, plastic, etc. and manufactured by a third party vendor (for example, by injection molding, milling, cutting, welding, binding, or other types of assembly) based on a design template or modified design.

The website for the design software application may include a webpage for industry engineers or other problem solvers to propose to the website's user community any particularly vexing problem or design request, which is followed by allowing users to design and propose solutions, individually or in groups.

The website for the design software application may include an interface accessible to industry engineers whereby an engineer could upload the schematic design of an entire article, to include the breakdown of its parts, to allow users: a) to re-design the article; b) propose new changes; c) to design around multiple existing problems; or d) to allow others in the industry (to include users) to license or purchase the article's design schematic. The collaborative design software application may be configured such that the user may charge a fee for the user's services and/or the industry engineer may offer for purchase or license the aforementioned re-design. As described above, the collaborative design software application may be configured to charge a fee (e.g., a flat fee and/or a percentage) to either the user and/or the industry engineer for facilitating the transaction.

The website for collaborative design software application may include a webpage that serves as a learning tool, allowing users, using the collaborative design software application, to design a product which accomplishes a pre-defined task, to test based on number of parts used, cost of total parts used, etc., and to assemble and disassemble an article in a timed situation, thereafter grading the users' work output based on time, accuracy, percent of parts missing or improperly installed, whether parts are crucial to the article, or other subjective testing criteria established by the test administrator. In addition to the collaborative learning described above, the collaborative design application may include tutorials, videos, list of known design constraints, etc.

Because the users of the collaborative design software application and other web users may speak and understand a variety of languages, the software application may be configured to translate design information from one language to another. For example, information regarding design templates, design modifications, and design specifications may be presented in multiple languages or may be presented in one language with an option to translation (via a machine or human translation) into multiple languages. Additionally the software application may provide a platform for collaborative learning in a variety of languages. For example, the tutorials, videos, list of known design constraints, etc. may be presented in multiple languages or may be presented in one language with an option to translation (via a machine or human translation) into multiple languages.

The website according to the present invention may be served to a user 130, 150 and presented in the user's browser software. The graphical user interface provides for user input (by way of a keyboard, keypad, touch screen, pointing device, voice recognition, or the like), and navigation (by way of, for example, hyperlinks that may be activated by a pointing device). Authentication software of the kind generally known in the art may be used to control access to some or all of the website functions. The user interface will include navigation links to access a user account (set up by the user), access the database of templates, create new projects, upload files from the computer system 130 or 150, download files from the server 110, access CAD tools, and review web pages for third parties (as discussed above).

Figure 2:
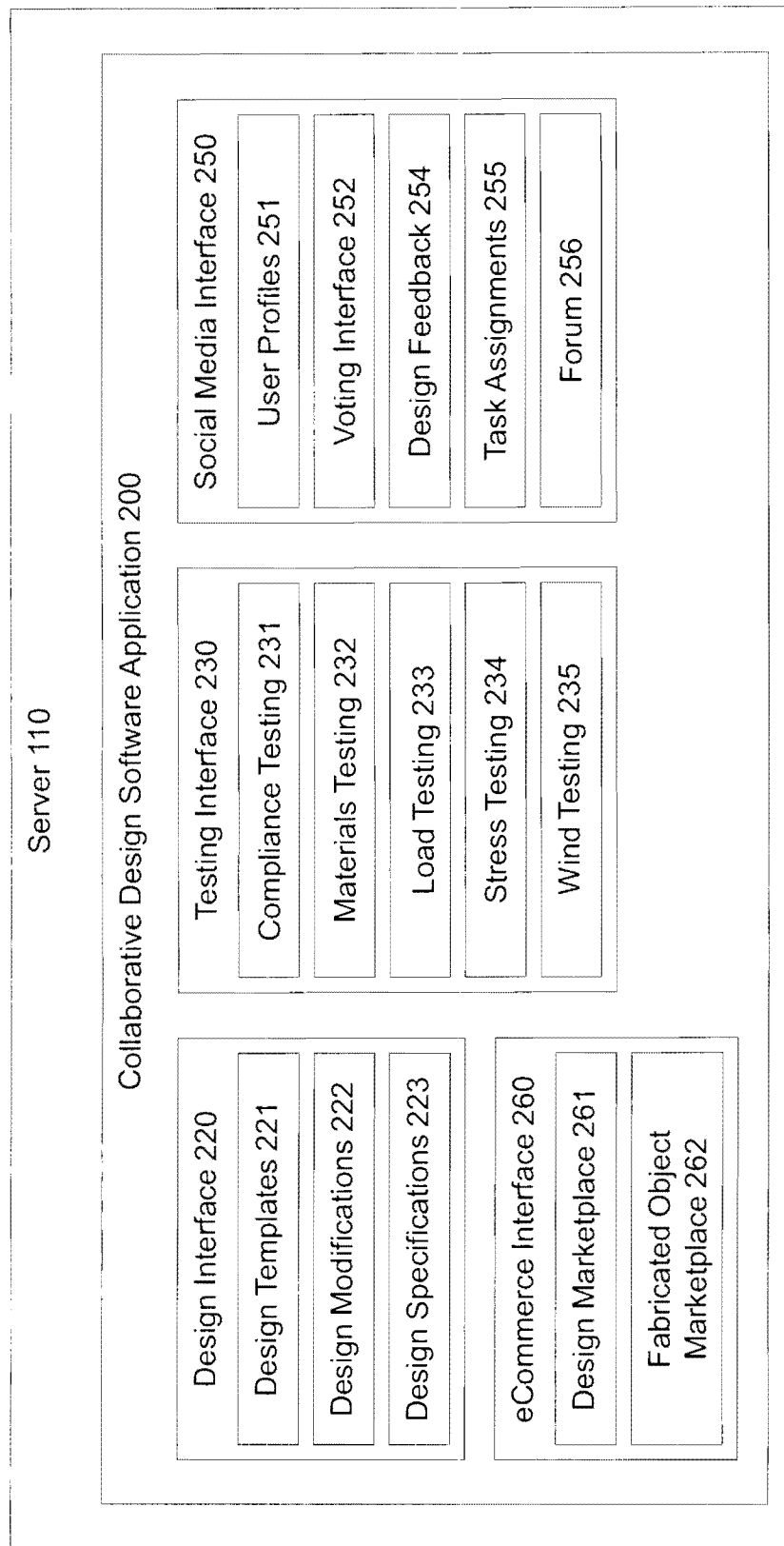
FIG. 2 is an overview of a collaborative design software application according to an exemplary embodiment of the present invention.

FIG. 2 is an overview of a collaborative design software application 200 according to an exemplary embodiment of the present invention. The collaborative design software application 200 may be stored on the server 110 illustrated in system 100 or 100' described above and may include a design interface 220, a testing interface 230, a social media interface 250, and an electronic commerce interface 260.

The design interface 220 may include design templates 221, design modifications 222, and design specifications 223. The design interface 220 may be, for example, a CAD-type application to assist in the creation, modification, analysis, or optimization of a design. The design templates 221 may be available to some or all users of the software application 200 to provide users with a generalized structure of an object. Users may perform design modifications 222 to the design templates 221 to form a modified design to perform specific functions or to meet other requirements of the user.

The design specifications 223 may specify, for example, the requirements of a design. For example, a vendor or other industry professional may input design specifications 223 and offer users the opportunity to use the software application 200 to produce a modified design which meets the design specifications 223 for a fee payable to users. As described above, the collaborative design software may also be configured to charge a fee (e.g., a flat fee and/or a percentage) to either the designer (e.g., user 130) and/or the purchaser (e.g., the industry representative 160) for facilitating the transaction between the designer and the purchaser. In another example, a professor of a mechanical engineering course may input design specifications 223 and students may use the software application 200 to produce a modified design which meets the design specifications 223 for course credit.

The design templates 221, design modifications 222, and the design specifications 223 may be stored, for example, in the database 120. The design templates 221 and the design specifications 223 may be created using the software application 200 and/or uploaded to the server 110, for example, from computing system 150 through the network 140.

The testing interface 230 may include a compliance testing interface 231 where the design templates 221 and the design modifications 222 are evaluated based on one or more design specifications 223. In this instance, for example, the design specifications 223 may be set by government regulations or industry standards. In another example, the design specifications 223 may be used to determine if parts designed to interlock in a design template 221 and/or design modification 222 fit together.

The testing interface 230 may also include a materials testing interface 232. The materials testing interface 232 may include storing the characteristics of at least one material, for example as one of the design specifications 223. The materials testing interface 232 may evaluate one or more materials based on strength, cost or compatibility with other materials included in a design template 221 or modified design.

The testing interface 230 may also include a load testing interface 233, a stress testing interface 234, and/or a wind testing interface 235, etc. The load testing 233, stress testing 234, and/or wind testing 235 may include instructions to model a virtual object based on a design template 221 and/or design modifications 222 and simulate an effect of an external force on the virtual object. For example, the testing interface 230 may simulate the effect of gravity and/or other loads or stresses on a virtual object. The wind testing 235 may also include determining whether wind forces of a specific velocity, frequency, amplitude, or direction cause the virtual object to experience harmonic oscillation. If the designer intends for the object to oscillate (for example, at a given frequency) the collaborative design software may highlight the area(s) of the design which might be modified to allow harmonic oscillation. Alternatively, if dangerous levels of harmonic oscillation are detected, the collaborative design software may highlight area(s) of the design which may be modified to reduce or eliminate the harmonic oscillation.

Using the social media interface 250, each user may have a user profile 251. Users may evaluate design templates 221 and design modifications 222 by using a voting interface 252 or an interface to provide design feedback 254. The social media interface 250 may also include a forum 256 and/or another communications medium for users to exchange ideas over the network 140. The social media interface 250 may include task assignments 255 where users may request other users to perform tasks. For example, a vendor or other industry professional may offer users the opportunity to use the software application 200 to perform a task for a fee. In another example, a professor of a mechanical engineering course may assign students a task for course credit.

The electronic commerce interface 260 may include a design marketplace 261 where users of the software 200 or other web users may purchase, license, or sell a design template 221 or modified design between and among consumers and/or industry professionals. For example, a user may purchase a modified design and use a 3-D printer to fabricate an object based on the modified design. The electronic commerce interface 260 may also include a fabricated object marketplace 262 where users of the software application 200 or other web users may purchase an object fabricated based on a design template 221 or modified design. The object may be wood, metal, plastic, etc. manufactured by a third party vendor (for example, an injection molding shop, a woodworking shop, a metalworking shop, etc.) by, for example, injection molding, milling, cutting, welding, binding, or other type of assembly based on a design template or modified design.

As described above, the collaborative design software application may provide a platform for designing, sharing, testing, purchasing, licensing, manufacturing, and selling designs in a variety of languages. Accordingly, the design interface 220, the testing interface 230, the social media interface 250, the electronic commerce interface 260, etc. may be presented in multiple languages or may be presented in one language with an option to translate (via a machine or human translation) into multiple languages.

Figure 3:
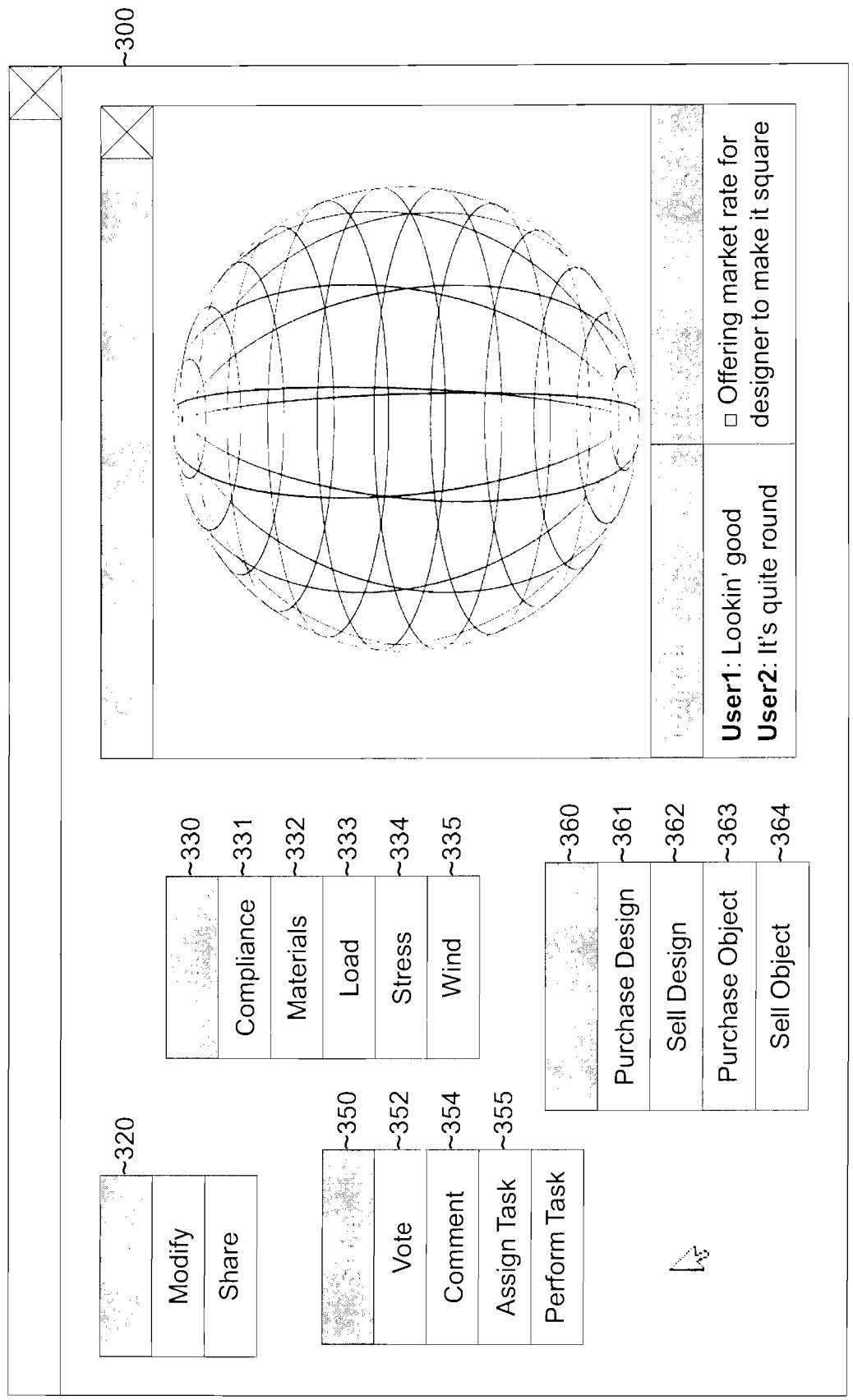
FIG. 3 illustrates a user interface of the collaborative design software application illustrated in FIG. 2 according to an exemplary embodiment of the present invention.

FIG. 3 illustrates a user interface 300 of the collaborative design software application 200 according to an exemplary embodiment of the present invention. The user interface 300 may include a design module 320, a testing module 330, a social media module 350, and an electronic commerce module 360.

The design module 320 may, for example, enable a user to perform a design modification 222 or share a design template 221 or modified design via the social media interface 250 or other online forum.

The testing module 330 may include a compliance testing module 331 enabling users to perform compliance testing on a design template 221 or modified design through the compliance testing interface 231 described above. The testing module 330 may also include a materials testing module 332 enabling users to perform materials testing on a design template 221 or modified design through the materials testing interface 232 described above. The testing module 330 may also include a load testing module 333 and/or a stress testing module 334 enabling users to perform load or stress testing on a design template 221 or modified design through the load testing interface 233 and/or stress testing interface 335 described above. The testing module 330 may also include a wind testing module 335 enabling users to perform wind testing on a design template 221 or modified design through the wind testing interface 235 described above.

The social media module 350 may include a voting module 352 enabling users to vote on a design template 221 or modified design and/or a commenting module 353 enabling users to comment on a design template 221 or modified design. In the example shown in user interface 300, "User1" and "User2" have submitted comments on the modified design "File1". The social media module 350 may also include a task assignment module 355 enabling users to assign a task or agree to perform a task. In the example shown in user interface 300, a vendor has offered to pay users a fee to perform a task regarding the modified design "File1".

The electronic commerce module 360 may include an option to purchase a design 361 or sell a design 362 through design marketplace 261 described above and an option to purchase a fabricated object 363 or sell a fabricated object 364 through the fabricated object marketplace 262 described above.

FIG. 4 is a user interface 400 of a user profile 251 of the collaborative design software application 200 described above, according to an exemplary embodiment of the present invention.

Referring to FIG. 4, the user interface 400 may include user information 410 and designs 420, which may be, for example, design templates 221 and/or design modifications 222. The user information 410 may include any information regarding a user (e.g., a user of a computer system such as the computer system 130 or 150) such as biographical information, education, current or previous employment information, relevant experience, the user's availability to perform contract work or (temporary or permanent) part-time or full-time employment, etc. The collaborative design software may be configured such that selecting a design 420 causes a user interface to be displayed, such as the user interface 300 of FIG. 3, with design 320, testing 330, social 350, electronic commerce 360 options.

The collaborative design software application 200 may be configured to provide tiered access to users of the software application and/or other web users. For example, a user profile 251 and a design portfolio of the user (e.g., as shown in user interface 400 of FIG. 4) may be available to the public (e.g., through the Internet or other network 140). Alternatively, the collaborative design software application 200 may be configured to provide each user with the option to determine whether the user's profile 251 or individual designs 420 are publicly available.

In another example, the collaborative design software application 200 may be configured such that only registered users are permitted to modify, test, vote on, comment on, or purchase a design or object. Alternatively, the collaborative design software application 200 may be configured such that the designer of each design 420 is given the option to permit certain users or groups of users to modify, test, vote on, and/or comment on a design 420.

For example, a professor of a mechanical engineering class may create a private network of students to view a design template 221 and design specifications 223. Each of the students may make design modifications 222 to the design template 221 and may decide whether the student's modified design 420 is available outside the private network created by the professor.

In one exemplary embodiment, a user has the option to show the user's profile 251 and designs 420 to the public to promote the user. The collaborative design software application 200, meanwhile, restricts the ability to contact or hire the user or purchase a design 420 or an object based on a design 420. By restricting the ability to contact or hire the user or purchase a design 420 or object, the collaborative design software application 200 is able to collect fees for facilitating the hiring of a user or the purchase of a design 420 or object.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A system for computer-aided design of an object, an article, or a consumer good, comprising:
   an application server comprising at least one processor-enabled medium having one or more modules of a design software application residing thereon that are executable by the at least one processor;
   a web server for providing a website interface for accessing the design software application; and
   a social network server,
   wherein the one or more executable modules of the design software application include at least a design module, a testing module, a user interface display module, a social media module, and a commerce module,
   wherein the user interface display module is configured to provide the website interface displayed on at least a computer of a first user and a computer of a second user, the interface comprising a first portion for receiving an input from any one or more of the at least first and second users to access the design module, a second portion for receiving an input from any one or more of the at least first and second users to access the testing module, a third portion for receiving an input from any one or more of the at least first and second users to access the social media module, and a fourth portion for receiving an input from any one or more of the at least first and second users to access the commerce module;
   wherein the design module is configured to:
      receive via the website at least a first input from the first user and, independent from the first user, a second input from the second user, wherein the inputs comprise one or more modifications to an existing design template of the object, the article, or the consumer good,
      permit each of the at least first and second users to provide comments about another user's input,
      compare the first and the second inputs from each of the at least first and second users to one or more predetermined criteria residing in the application server processor-enabled medium,
      accept any one or more of the first and the second inputs if it or they satisfy the one or more predetermined criteria and reject any one or more of the first and the second inputs if it or they do not satisfy the one or more predetermined criteria, and
      modify by the design module the existing design template based on the accepted one or ones of the first and second inputs to generate a modified design template of the object, the article, or the consumer good,
   wherein the testing module is configured to receive the second portion input from any one or more of the at least first and second users via the website, and thereafter cause the at least one application server processor to execute the testing module for evaluating the modified design template using one or more of the one or more predetermined criteria,
   wherein the social media module is configured to receive the third portion input from any one or more of the at least first and second users via the website, and thereafter display one or more of a plurality of user profiles and a voting-based ranking of the modified design template relative to other users' modified design templates, the user profiles comprising information about the at least first and second users and the modified design template modified by the design module, and
   wherein the commerce module is configured to receive the fourth portion input from any one or more of the at least first and second users via the website, and thereafter generate an electronic commerce marketplace for providing to a third party an offer of a sale, purchase, or license of the modified design template, or a purchase of the object, article, or consumer good based on the modified design template, or to make a design request.

2. The system of claim 1, further comprising a 3-D printer configured to fabricate the object, the article, or the consumer good, based on the modified design template.

3. The system of claim 1, wherein the design software application is further configured to display the modified design template or information contained in the modified design template by the social media module to elicit feedback from other users of the design software application.

4. The system of claim 1, wherein the design software application is further configured to output the modified design template or information contained in the modified design template by the social media module to the social media server to elicit feedback from web users other than the users of the design software application.

5. The system of claim 1, wherein evaluating the modified design template using one or more of the one or more predetermined criteria includes determining whether the modified design template or information contained in the modified design template complies with government regulations or industry standards.

6. The system of claim 1, wherein the comparison of the modified design template using one or more of the one or more predetermined criteria includes determining whether parts designed to interlock actually fit together.

7. The system of claim 1, wherein the comparison of the modified design template using one or more of the one or more predetermined criteria includes modeling a virtual object, article, or consumer good, based on the modified design template or information contained in the modified design template and simulating an effect of an external force on the virtual object, article, or consumer good.

8. The system of claim 7, wherein the external force includes gravity or a wind force.

9. The system of claim 8, wherein the simulated effect includes determining whether the wind force will cause a harmonic oscillation of the virtual object, article, or consumer good.

10. The system of claim 1, wherein the modified design template or information contained in the modified design template identifies at least one material to fabricate the object, the article, or the consumer good, and the comparison of the modified design template or information contained in the modified design template using one or more of the one or more predetermined criteria includes evaluating at least one material.

11. The system of claim 10, wherein the evaluation of the one or more materials includes evaluating the one or more materials based on strength, cost or compatibility with other materials included in the modified design template or information contained in the modified design template.

12. The system of claim 1, wherein the design software application is further configured to store the predetermined criteria and evaluate a second modified design template based on the predetermined criteria.

13. The system of claim 1, wherein the existing design template and the modified design template comprise information useful in fabricating one of an automobile part, an article of clothing, and a household appliance.

14. A non-transitory computer readable storage medium comprising a design software application having one or more executable software modules including at least a design module, a test module, a user interface display module, a social media module, a commerce module, and one or more predetermined criteria,
wherein the design module is configured to:
receive from a first computer system operated by a first user at least a first input comprising one or more first modifications to an existing design template of an object, an article, or a consumer good;
receive from a second computer system independent from the first computer system operated by a second user a second input comprising one or more second modifications to the existing design template;
permit each of the first and the second users to provide comments about the other user's input,
compare the first and the second inputs from each of first and the second users to the one or more predetermined criteria;
accept any one or more of the first and the second inputs if it or they satisfy the one or more predetermined criteria and reject any one or more of the first and the second inputs if it or they do not satisfy the one or more predetermined criteria,
modify by the design module the existing design template based on the accepted one or ones of the first and second inputs to generate a modified design template of the object, the article, or the consumer good,
wherein the user interface display module is configured to provide a website interface displayed on at least a computer of a first user and a computer of a second user, the interface comprising a first portion for receiving an input from any one or more of the at least first and second users to access the design module, a second portion for receiving an input from any one or more of the at least first and second users to access the testing module, a third portion for receiving an input from any one or more of the at least first and second users to access the social media module, and a fourth portion for receiving an input from any one or more of the at least first and second users to access the commerce module;
wherein the testing module is configured to receive the second portion input from any one or more of the at least first and second users via the website, and thereafter cause the at least one application server processor to execute the testing module for evaluating the modified design template using one or more of the one or more predetermined criteria,
wherein the social media module is configured to receive the third portion input from any one or more of the at least first and second users via the website, and thereafter display one or more of a plurality of user profiles and a voting-based ranking of the modified design template relative to other users' modified design templates, the user profiles comprising information about the at least first and second users and the modified design template modified by the design module, and
wherein the commerce module is configured to receive the fourth portion input from any one or more of the at least first and second users via the website, and thereafter generate an electronic commerce marketplace for providing to a third party an offer of a sale, purchase, or license of the modified design template, or a purchase of the object, article, or consumer good based on the modified design template, or to make a design request.

15. The computer readable storage medium of claim 14, wherein the application is further configured to output the modified design to a 3-D printer configured to fabricate the object, the article, or the consumer good based on the modified design template.

16. A method of manufacturing an object, an article, or a consumer good, the method comprising:
providing an application server comprising at least one processor-enabled medium having one or more modules of a design software application residing thereon that are executable by the at least one processor, wherein the one or more executable software modules include at least a design module, a test module, a user interface display module, a social media module, a commerce module, and one or more predetermined criteria, wherein the test module is configured to receive an input from any one or more of at least a first and a second user and thereafter cause the at least one application server processor to execute the test module for evaluating a modified design template using one or more of the one or more predetermined criteria, wherein the social media module is configured to display by a web server one or more of a plurality of user profiles, the user profiles comprising information about a respective user and the modified design template modified by the design module, and wherein the commerce module is configured to offer for sale, purchase, or license to a web user other than the at least the first or the second user, the modified design template;

providing the web server different from the application server processor, having a computer code residing thereon that is executable by at least one processor for providing a website interface for at least the first user and the second user to access the design software application using respective first and second computers;

receiving from the first user via the website displayed on the first computer a first input comprising a first modification to the existing design template for creating a new design of the object, the article, or the consumer good;

receiving from the second user independently from the first user via the website displayed on the second computer a second input comprising a second modification to the existing design template;

comparing the inputs from each of the first and second users to the one or more predetermined criteria;

accepting any one or more of the user inputs if it or they satisfy the one or more predetermined criteria and rejecting any one or more of the user inputs if it or they do not satisfy the one or more predetermined criteria;

modifying by the design module the existing design template based on the accepted user inputs to generate the modified design template of the object, the article, or the consumer good; and displaying an offer for sale, purchase, or license to a web user other than the at least the first or the second user, the modified design template.

17. The method of claim 16, further comprising:

outputting the modified design template to a 3-D printer configured to fabricate the object, the article, or the consumer good based on the modified design template.

* * * * *